(12) United States Patent
Richter et al.

(10) Patent No.: US 11,142,333 B1
(45) Date of Patent: Oct. 12, 2021

(54) SYSTEM AND METHOD FOR FLIGHT CONTROL IN ELECTRIC AIRCRAFT

(71) Applicant: BETA AIR, LLC, South Burlington, VT (US)

(72) Inventors: Timothy Gerard Richter, Wynantskill, NY (US); Andrew Giroux, Georgia, VT (US); Nicholas Moy, Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/197,427

(22) Filed: Mar. 10, 2021

(51) Int. Cl.
    *B64D 27/24* (2006.01)
    *B64D 43/00* (2006.01)
(52) U.S. Cl.
    CPC ............. *B64D 43/00* (2013.01); *B64D 27/24* (2013.01)
(58) Field of Classification Search
    CPC ........ B64D 31/00; B64D 35/00; B64D 27/24; B64C 27/28; B64C 27/56; B64C 27/10; B64C 39/022; B64C 1/16; B64C 39/024; B64C 15/00; B64C 2201/14; B64F 5/60; G05D 1/0061; G05D 1/0816; G05D 1/0858; G05D 1/0825; G05D 1/085; B60W 30/18127; G05B 17/02
    See application file for complete search history.

(56) References Cited

U.S. PATENT DOCUMENTS

| | | | |
|---|---|---|---|
| 3,848,833 A * | 11/1974 | Rauschelbach | G05D 1/0061 244/177 |
| 7,357,352 B2 | 4/2008 | Speer | |
| 9,958,874 B2 | 5/2018 | Yu | |
| 10,281,890 B1 | 5/2019 | Kroo | |
| 10,494,095 B2 | 12/2019 | Groninga | |
| 2016/0059958 A1 | 3/2016 | Kvitnevskiy | |
| 2018/0362146 A1 | 12/2018 | Klein | |
| 2019/0071172 A1 * | 3/2019 | Caldwell | B64D 35/00 |
| 2019/0196509 A1 | 6/2019 | Hagerott | |

(Continued)

OTHER PUBLICATIONS

Ducard et al., Hexacopter Flight Performance Comparison with CCA vs. WCA Control Allocation, 2020, IEEE, p. 697-702 (Year: 2020).*

(Continued)

*Primary Examiner* — Mcdieunel Marc
(74) *Attorney, Agent, or Firm* — Caldwell Intellectual Property Law, LLC

(57) ABSTRACT

A system for flight control in electric aircraft includes a flight controller configured to provide an initial vehicle torque signal including a plurality of attitude commands. The system includes a mixer configured to receive the initial vehicle torque signal and a vehicle torque limit, receive prioritization data including a prioritization datum corresponding to each of the plurality of attitude command, determine a plurality of modified attitude commands as a function of the vehicle torque limit, the attitude commands, and the prioritization data, generate, as a function of modified attitude commands, an output torque command including the initial vehicle torque signal adjusted as a function of the vehicle torque limit, generate, as a function of the output torque command, a remaining vehicle torque. The system includes a display, wherein the display is configured to present, to a user, the remaining vehicle torque and the output torque command.

20 Claims, 7 Drawing Sheets

(56) References Cited

U.S. PATENT DOCUMENTS

| | | | | |
|---|---|---|---|---|
| 2019/0202546 | A1* | 7/2019 | Mahboubi | B64C 27/28 |
| 2019/0332126 | A1* | 10/2019 | Irwin, III | B64C 27/56 |
| 2020/0031478 | A1* | 1/2020 | Clark | B64C 1/16 |
| 2020/0156636 | A1* | 5/2020 | Oh | B60W 30/18127 |
| 2020/0277080 | A1* | 9/2020 | Wiegman | B64F 5/60 |
| 2020/0307390 | A1* | 10/2020 | Clark | B64D 31/00 |
| 2021/0053676 | A1* | 2/2021 | Brand | B64C 39/022 |
| 2021/0109547 | A1* | 4/2021 | Clark | G05D 1/0816 |
| 2021/0139138 | A1* | 5/2021 | Clark | B64C 27/10 |

OTHER PUBLICATIONS

Duda et al., Design and analysis of lunar lander manual control modes, 2009, IEEE, p. 1-16 (Year: 2009).*

Xu et al., Full Attitude Control of an Efficient Quadrotor Tail-sitter VTOL UAV with Flexible Modes, 2019, IEEE, p. 542-550 (Year: 2019).*

Magsino et al., Stabilizing quadrotor altitude and attitude through speed and torque control of BLDC motors, 2014, IEEE, p. 438-443 (Year: 2014).*

Web Site: http://scholarworks.sjsu.edu/cgi/viewcontent.cgi?article=8363&context=etd_theses Title:Simulated Annealing-Based Optimal Proportional-Integral-Derivative (PID) Controller Design: A Case Study on Nonlinear Quadcopter Dynamics by: Kristofer Kevin Nemirsky Date: May 2017.

Web Site: https://arxiv.org/pdf/1809.04048 Title: Accurate tracking of aggressive quadrotor trajectories using incremental nonlinear dynamic inversion and differential flatness by: Ezra Tal, Sertac Karaman Date: Jun. 19, 2020.

* cited by examiner

SYSTEM AND METHOD FOR FLIGHT CONTROL IN ELECTRIC AIRCRAFT

FIELD OF THE INVENTION

The present invention generally relates to the field of electric aircraft. In particular, the present invention is directed to system and method for flight control in electric aircraft.

BACKGROUND

The burgeoning of electric vertical take-off and landing (eVTOL) aircraft technologies promises an unprecedented forward leap in energy efficiency, cost savings, and the potential of future autonomous and unmanned aircraft. However, the technology of eVTOL aircraft is still lacking in crucial areas of control. This is particularly problematic as it compounds the already daunting challenges to designers and manufacturers developing the aircraft for manned and/or unmanned flight in the real world.

SUMMARY OF THE DISCLOSURE

In an aspect, a system for flight control in electric aircraft includes a flight controller, wherein the flight controller is configured to provide an initial vehicle torque signal comprising a plurality of attitude commands. The system includes a mixer, wherein the mixer includes circuitry configured to receive the initial vehicle torque signal, receive at least a vehicle torque limit, receive a plurality of prioritization data, the plurality of prioritization data including a prioritization datum corresponding to each of the plurality of attitude command, determine a plurality of modified attitude commands as a function of the at least a vehicle torque limit, the plurality of attitude commands, and the plurality of prioritization data, generate, as a function of modified attitude commands, an output torque command, wherein the output torque command includes the initial vehicle torque signal adjusted as a function of the at least a vehicle torque limit, generate, as a function of the output torque command, a remaining vehicle torque. The system includes a display, wherein the display is configured to present, to a user, the remaining vehicle torque and the output torque command.

In another aspect, a method for flight control in electric aircraft includes providing, at the flight controller, an initial vehicle torque signal comprising at least an attitude command, receiving, at the mixer, the initial vehicle torque signal including a plurality of attitude commands, receiving, at the mixer, at least a vehicle torque limit, receiving, at the mixer, a plurality of prioritization data including a prioritization datum corresponding to each of the plurality of attitude commands, determining, at the mixer, a plurality of modified attitude commands as a function of the at least a vehicle torque limit, the plurality of attitude commands, and the plurality of prioritization data, generating, at the mixer, as a function of modified attitude commands, an output torque command, wherein the output torque command includes the initial vehicle torque signal adjusted as a function of the at least a vehicle torque limit, generating, at the mixer, as a function of the output torque command, a remaining vehicle torque, and displaying to a user the remaining vehicle torque and the output torque command.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to embodiments oriented as shown for exemplary purposes in FIG. 6. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
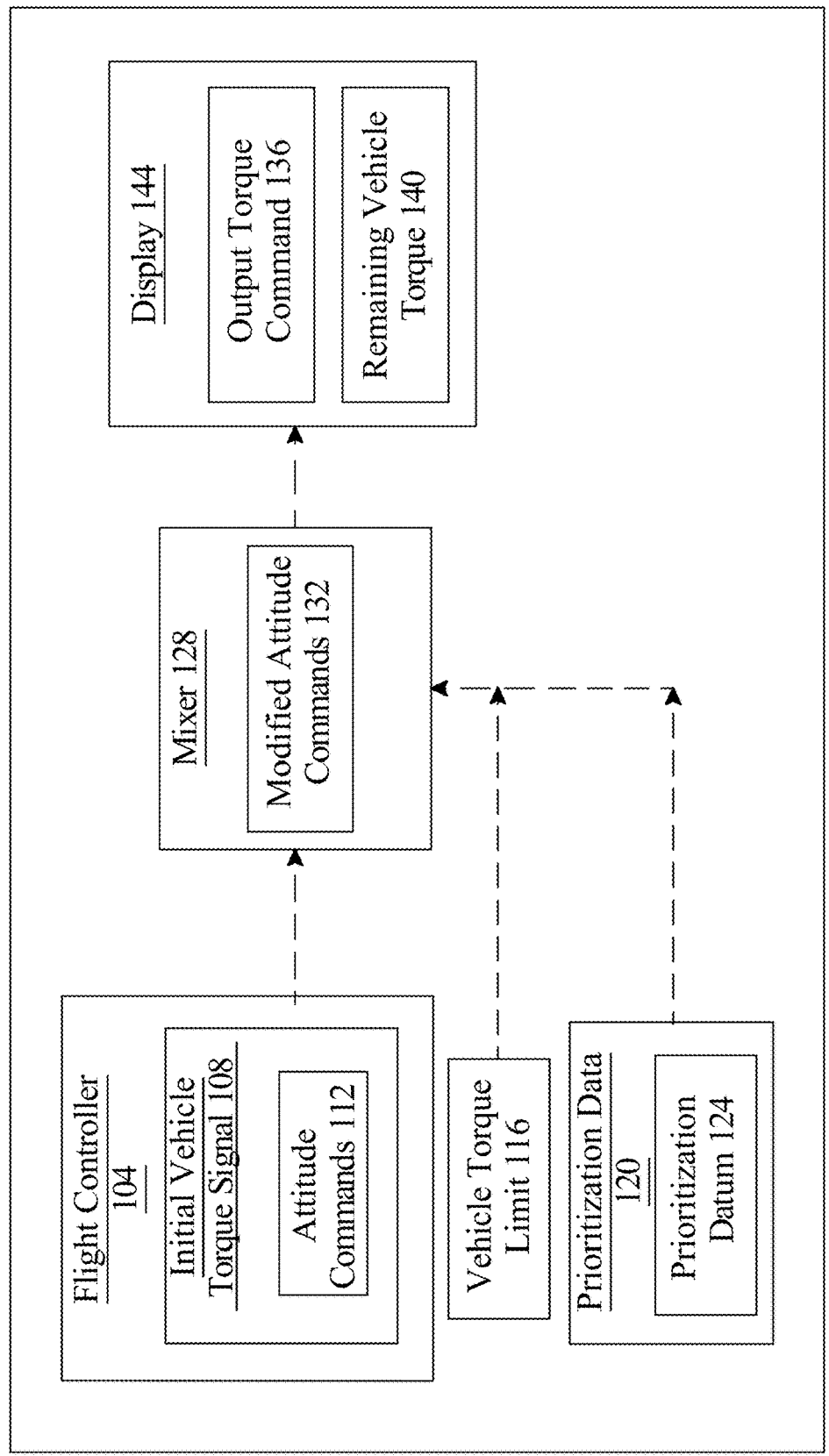
FIG. 1 is a block diagram illustrating an exemplary embodiment of a system for flight control in electric aircraft.

Still referring FIG. 1, system 100 may include a computing device, which may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing Device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

Still referring to FIG. 1, computing device that may be present in system 100 may be designed and/or configured to perform any method, method step, or sequence of method steps in any embodiment described in this disclosure, in any order and with any degree of repetition. For instance, Computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, system 100 configured for use in electric aircraft is presented. System 100 includes flight controller 104 configured to provide initial vehicle torque signal 108 for at least a propulsor. Flight controller 104 may be a computing device as previously disclosed. Flight controller 104 may be a processor configured to control the output of a plurality of propulsors in response to inputs. Inputs to this system may include pilot manipulations of physical control interfaces, remote signals generated from electronic devices, voice commands, physiological readings like eye movements, pedal manipulation, or a combination thereof, to name a few. Flight controller 104 may include a proportional-integral-derivative (PID) controller. A "PID controller", for the purposes of this disclosure, is a control loop mechanism employing feedback that calculates an error value as the difference between a desired setpoint and a measured process variable and applies a correction based on proportional, integral, and derivative terms; integral and derivative terms may be generated, respectively, using analog integrators and differentiators constructed with operational amplifiers and/or digital integrators and differentiators, as a non-limiting example. PID controllers may automatically apply accurate and responsive correction to a control function in a loop, such that over time the correction remains responsive to the previous output and actively controls an output. Flight controller 104 may include damping, including critical damping to attain the desired setpoint, which may be an output to a propulsor in a timely and accurate way.

Still referring to FIG. 1, flight controller 104 may be implemented consistently with any flight controller as described herein. Flight controller 104 is configured to provide an initial vehicle torque signal 108 comprising a plurality of attitude commands 112. Initial vehicle torque signal 108 may include a desired change in aircraft trajectory as inputted by an onboard or offboard pilot, remotely located user, one or more computing devices such as an "autopilot" program or module, any combination thereof, or the like. Initial vehicle torque signal 108 may include without limitation one or more electrical signals, audiovisual signals, physical indications of desired vehicle-level torques and forces, or the like. "Trajectory", for the purposes of this disclosure is the path followed by a projectile or vehicle flying or an object moving under the action of given forces. Trajectory may be altered by aircraft control surfaces and/or one or more propulsors working in tandem to manipulate a fluid medium in which the object is moving through. Initial vehicle torque signal 108 may include a signal generated from manipulation of a pilot input control consistent with the entirety of this disclosure.

Further referring to FIG. 1, flight controller 104 may include one or more circuit elements communicatively coupled together. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

Still referring to FIG. 1, at least a sensor may be configured to detect pilot input from at least pilot control. At least pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. At least pilot control may be physically located in the cockpit of the aircraft or remotely located outside of the aircraft in another location communicatively connected to at least a portion of the aircraft. "Communicatively connect", for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. At least pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, initial vehicle torque signal 108.

With continued reference to FIG. 1, initial vehicle torque signal 108, which is provided by flight controller 104, includes a plurality of attitude commands 112. "Attitude", for the purposes of this disclosure, is the relative orientation of a body, in this case an electric aircraft, as compared to earth's surface or any other reference point and/or coordinate system. Attitude is generally displayed to pilots, personnel, remote users, or one or more computing devices in an attitude indicator, such as without limitation a visual representation of the horizon and its relative orientation to the aircraft. Plurality of attitude commands 112 may indicate one or more measurements relative to an aircraft's pitch, roll, yaw, or throttle compared to a relative starting point. One or more sensors may measure or detect the aircraft's attitude and establish one or more attitude datums. An "attitude datum", for the purposes of this disclosure, refers to at least an element of data identifying and/or a pilot input or command. At least a pilot control may be communicatively connected to any other component presented in system, the communicative connection may include redundant connections configured to safeguard against single-point failure. Plurality of attitude commands 112 may indicate a pilot's instruction to change the heading and/or trim of an electric aircraft. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure, hereinbelow. "Pitch", for the purposes of this disclosure refers to an aircraft's angle of attack, that is the difference between the aircraft's nose and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Pilot input, when referring to throttle, may refer to a pilot's desire to increase or decrease thrust produced by at least a propulsor. Initial vehicle torque signal 108 may include an electrical signal. At least an aircraft command 104 may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor may include circuitry, computing devices, electronic components or a combination thereof that translates pilot input into at initial vehicle torque signal 108 configured to be transmitted to another electronic component. Plurality of attitude commands 112 may include a total attitude command datum, such as a combination of attitude adjustments represented by one or a certain number of combinatorial datums. Plurality of attitude commands 112 may include individual attitude datums representing total or relative change in attitude measurements relative to pitch, roll, yaw, and throttle.

With continued reference to FIG. 1, vehicle-level torque commands such as initial vehicle torque signal 108 may be translated into propulsor commands such as output torque command 136 through modified attitude commands 132 in mixer 128 such that onboard electronics solve systems of equations in pitch moment, roll moment, yaw moment, and collective force may send each of a plurality of propulsors signals to achieve the desired vehicle torque. It should be noted that "collective force" may additionally or alternatively be called "assisted lift force" and that this terminology does not alter the meaning of either "collective force" or "assisted lift force" as used herein. Here, "desired vehicle torque" is directly related to initial vehicle torque signal 108 consistent with the disclosure. It should be noted by one of ordinary skill in the art that initial vehicle torque signal 108 may be received from flight controller 104 as a calculated input, user input, or combination thereof. Flight controller 104 may include and/or communicate with any computing device, including without limitation a microcontroller, microprocessor, digital signal processor (DSP) and/or system on a chip (SoC). Flight controller 104 may be programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Flight controller 104 may be designed and configured to operate electronic aircraft via fly-by-wire. Flight controller 104 is communicatively connected to each propulsor; as used herein, flight controller 104 is communicatively connected to each propulsor where flight controller 104 is able to transmit signals to each propulsor and each propulsor is configured to modify an aspect of propulsor behavior in response to the signals. As a non-limiting example, flight controller 104 may transmit signals to a propulsor via an electrical circuit connecting flight controller 104 to the propulsor; the circuit may include a direct conductive path from flight controller 104 to propulsor or may include an isolated coupling such as an optical or inductive coupling. Alternatively, or additionally, flight controller 104 may communicate with a propulsor using wireless communication, such as without limitation communication performed using electromagnetic radiation including optical and/or radio communication, or communication via magnetic or capacitive coupling. Vehicle controller may be fully incorporated in an electric aircraft containing a propulsor and may be a remote device operating the electric aircraft remotely via wireless or radio signals, or may be a combination thereof, such as a computing device in the aircraft configured to perform some steps or actions described herein while a remote device is configured to perform other steps. Persons skilled in the art will be aware, after reviewing the entirety of this disclosure, of many different forms and protocols of communication that may be used to communicatively connect flight controller 104 to propulsors. Persons skilled in the art, upon reviewing the entirety of this disclosure, will be aware of various ways to monitor resistance levels and apply resistance to linear thrust control, as used and described herein.

With continued reference to FIG. 1, system 100 includes mixer 128 configured to receive initial vehicle torque signal 108 including plurality of attitude commands 112. Receiving may include receiving one or more electrical signals transmitted wirelessly or through a wired connection. Mixer 128 may be one or more computing devices configured to perform torque allocation to one or more propulsors in an electric aircraft to alter pitch, roll, yaw, and lift (or throttle). Initial vehicle torque signal 108 may be any initial vehicle torque signal as described herein. Initial vehicle torque signal 108 may represent one or more elements of data describing current, past, or future aircraft orientations relative to the earth's horizon, or attitude, thus including a plurality of attitude commands 112 as described herein.

With continued reference to FIG. 1, a "mixer", for the purposes of this disclosure, may be a component that takes in at least an incoming signal, such as initial vehicle torque signal 108 including plurality of attitude commands 112 and allocates one or more outgoing signals, such as modified attitude commands 132 and output torque command 136, or the like, to at least a propulsor, flight component, or one or more computing devices connected thereto. One of ordinary skill in the art, after reading the entirety of this disclosure, would be aware that a mixer, as used herein, may additionally or alternatively be described as performing "control allocation" or "torque allocation". For example, mixer 128 may take in commands to alter aircraft trajectory that requires a change in pitch and yaw. Mixer 128 may allocate torque to at least one propulsor (or more) that do not independently alter pitch and yaw in combination to accomplish the command to change pitch and yaw. More than one propulsor may be required to adjust torques to accomplish the command to change pitch and yaw, mixer 128 would take in the command and allocate those torques to the appropriate propulsors consistent with the entirety of this disclosure. One of ordinary skill in the art, after reading the entirety of this disclosure, will appreciate the limitless combination of propulsors, flight components, control surfaces, or combinations thereof that could be used in tandem to generate some amount of authority in pitch, roll, yaw, and lift of an electric aircraft consistent with this disclosure. Mixer 128 may be a nonlinear program-based mixer that create new frequencies from two signals applied to it. In most applications, two signals are applied to mixer 128, and it produces new signals at the sum and difference of the original frequencies. Other frequency component may also be produced in a practical frequency mixer. One of ordinary skill in the art would understand that, in general, mixers are widely used to shift signals from one frequency range to another, a process known as heterodyning. Another form of mixer operates by switching, with the smaller input signal being passed inverted or noninverted according to the phase of the local oscillator (LO). This would be typical of the normal operating mode of a packaged double balanced mixer, with the local oscillator drive considerably higher than the signal amplitude. Mixer 128 may be consistent with any mixer described herein. Mixer 128 may be implemented using an electrical logic circuit. "Logic circuits", for the purposes of this disclosure, refer to an arrangement of electronic components such as diodes or transistors acting as electronic switches configured to act on one or more binary inputs that produce a single binary output. Logic circuits may include devices such as multiplexers, registers, arithmetic logic units (ALUs), computer memory, and microprocessors, among others. In modern practice, metal-oxide-semiconductor field-effect transistors (MOSFETs) may be implemented as logic circuit components. Mixer 128 may be implemented using a processor. Mixer 128 is configured to receive the initial vehicle torque signal 108 for at least a propulsor from flight controller 104. Mixer 128 solves at least an optimization problem. At least an optimization problem may include solving the pitch moment function that may be a nonlinear program.

With continued reference to FIG. 1, system 100 includes mixer 128 configured to receive at least a vehicle torque limit 116. Vehicle torque limit 116 may include one or more elements of data representing maxima, minima, or other limits on vehicle torques, forces, attitudes, rates of change, or a combination thereof. Vehicle torque limit 116 may include individual limits on one or more propulsors, one or more flight components, structural stress or strain, energy consumption limits, or a combination thereof. Vehicle torque limit 116 may include attitudes in which aircraft cannot enter such as maximum or minimum pitch angle or pitch angle rate of change, vehicle torque limit 116 in a non-limiting example, may include a limit on one or more propulsors calculated in order to keep aircraft within a pitch angle range. Vehicle torque limit 116 may be a relative limit, as in a non-limiting example, may include maximum lift from one or more propulsors based on environmental factors such as air density. Vehicle torque limits 116 may include graphical limits, such as points or lines on a graphical representation of certain attitudes, such as pitch vs. lift, or pitch vs. roll, for example. Vehicle torque limits 116 may be displayed to a pilot, user, or be embedded in the controls such that a pilot is unable to maneuver an aircraft that would violate a vehicle torque limit 116 as described herein.

With continued reference to FIG. 1, mixer 128 includes circuitry configured to receive a plurality of prioritization data 120 including a prioritization datum 124 corresponding to each of the plurality of attitude commands 112. Plurality of prioritization data 120 may include one or more elements of data representing relative weight, importance, preservation, or otherwise ranking of attitudes of an aircraft. Prioritization datum 124 may be one of the plurality of prioritization data 120, such as the relative importance of each attitude command 112. For example, and without limitation, prioritization datum 124 may include a coefficient associated with the pitch attitude command, this coefficient would determine a rank of preservation of pitch attitude command relative to roll, yaw, and lift. That is to say that if a pilot commands aircraft to change pitch and yaw, and the command would violate vehicle torque limit 116, the mixer 128 would determine the relatively higher importance of pitch, and preserve the pitch command, while compromising the yaw command, according to available power to the propulsor, this process will be detailed in further depth with regard to FIGS. 3A and 3B.

With continued reference to FIG. 1, mixer 128 is configured to determine a plurality of modified attitude commands 132 as a function of the at least a vehicle torque limit 116, plurality of attitude commands 112 and the plurality of prioritization data 120. Mixer 128 may allocate torque to plurality of propulsors such that attitude commands 112 are adjusted as a function of prioritization data 120 and vehicle torque limits 116. Modified attitude commands 132 may be prioritized to preserve more important attitude commands, for instance as represented by prioritization data 120, when the vehicle torque limits 116 precludes all attitude commands 112 from being executed exactly as inputted. Modified attitude commands 132 may include one or more attitude commands within the vehicle torque limits 116. Mixer 128 may generate modified attitude command 132 for at least a propulsor as a function of solving the at least an optimization problem. Mixer 128 may transmit modified attitude command 132 to at least a propulsor. Modified attitude command 132 may be used iteratively as a torque limit in a control loop such that system 100 can adjust at a certain rate to outside conditions such as environmental conditions, namely airspeed, altitude, attitude, air density, and the like.

With continued reference to FIG. 1, mixer 128 is configured to generate, as a function of modified attitude commands 132, output torque command 136. Output torque command 136 may include one or more signals to one or more propulsors indicating the torque to be produced at the one or more propulsors to achieve the modified attitude commands 132. For example, and without limitation, where modified attitude command 132 includes a pitch up of 5 degrees and a change in yaw to the right of 2 degrees, output torque command 136 may indicate the output each propulsor must output individually to maneuver the aircraft in tandem. Output torque command 136 may include electrical signals consistent with the entirety of this disclosure, which may be generated based on the torque command in any manner that may occur to a person skilled in the art upon reviewing the entirety of this disclosure.

With continued reference to FIG. 1, mixer 128 may be configured to generate, as a function of output torque command 136, remaining vehicle torque 140. Remaining vehicle torque 140 may include torque available at each of a plurality of propulsors at any point during an aircraft's entire flight envelope, such as before, during, or after a maneuver. For example, and without limitation, output torque command 136 may indicates torque a propulsor must output to accomplish a maneuver; remaining vehicle torque may then be calculated based on one or more of the propulsor limits, vehicle torque limits as described herein, environmental limits as described herein, or a combination thereof. Remaining vehicle torque 140 may be represented, as a non-limiting example, as a total torque available at an aircraft level, such as the remaining torque available in any plane of motion or attitude component such as pitch torque, roll torque, yaw torque, and/or lift torque.

With continued reference to FIG. 1, mixer 128 may be configured to solve at least an optimization problem, which may be an objective function. An "objective function," as used in this disclosure, is a mathematical function with a solution set including a plurality of data elements to be compared. Mixer 128 may compute a score, metric, ranking, or the like, associated with each performance prognoses and candidate transfer apparatus and select objectives to minimize and/or maximize the score/rank, depending on whether an optimal result is represented, respectively, by a minimal and/or maximal score; an objective function may be used by mixer 128 to score each possible pairing. At least an optimization problem may be based on one or more objectives, as described below. Mixer 128 may pair a candidate transfer apparatus, with a given combination of performance prognoses, that optimizes the objective function. In various embodiments solving at least an optimization problem may be based on a combination of one or more factors. Each factor may be assigned a score based on predetermined variables. In some embodiments, the assigned scores may be weighted or unweighted.

Solving at least an optimization problem may include performing a greedy algorithm process, where optimization is performed by minimizing and/or maximizing an output of objective function. A "greedy algorithm" is defined as an algorithm that selects locally optimal choices, which may or may not generate a globally optimal solution. For instance, mixer 128 may select objectives so that scores associated therewith are the best score for each goal. For instance, in non-limiting illustrative example, optimization may determine the pitch moment associated with an output of at least a propulsor based on an input.

Still referring to FIG. 1, at least an optimization problem may be formulated as a linear objective function, which mixer 128 may optimize using a linear program such as without limitation a mixed-integer program. A "linear program," as used in this disclosure, is a program that optimizes a linear objective function, given at least a constraint; a linear program maybe referred to without limitation as a "linear optimization" process and/or algorithm. For instance, in non-limiting illustrative examples, a given constraint might be torque limit, and a linear program may use a linear objective function to calculate maximum output based on the limit. In various embodiments, mixer 128 may determine a set of instructions towards achieving a user's goal that maximizes a total score subject to a constraint that there are other competing objectives. A mathematical solver may be implemented to solve for the set of instructions that maximizes scores; mathematical solver may be implemented on mixer 128 and/or another device in system 100, and/or may be implemented on third-party solver. At least an optimization problem may be formulated as nonlinear least squares optimization process. A "nonlinear least squares optimization process," for the purposes of this disclosure, is a form of least squares analysis used to fit a set of m observations with a model that is non-linear in n unknown parameters, where m is greater than or equal to n. The basis of the method is to approximate the model by a linear one and to refine the parameters by successive iterations. A nonlinear least squares optimization process may output a fit of signals to at least a propulsor. Solving at least an optimization problem may include minimizing a loss function, where a "loss function" is an expression an output of which a ranking process minimizes to generate an optimal result. As a non-limiting example, mixer 128 may assign variables relating to a set of parameters, which may correspond to score components as described above, calculate an output of mathematical expression using the variables, and select an objective that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

With continued reference to FIG. 1, mixer 128 may include an inertia compensator. An inertia compensator may include one or more computing devices, an electrical component, circuitry, one or more logic circuits or processors, or the like, which may configured to compensate for inertia in one or more propulsors present in system 100. Mixer 100 is configured, in general, to output signals and command propulsors to produce a certain amount of torque; however, real-world propulsors contain mass, and therefore have inertia. "Inertia", for the purposes of this disclosure, is a property of matter by which it continues in its existing state of rest or uniform motion in a straight line, unless that state is changed by an external force. Specifically, in this case, a massive object requires more force or torque to start motion than is required to continue producing torque. In a control system, mixer 128 must therefore modulate the would-be signal to account for inertia of the physical system being commanded. The inertia compensator may make appropriate calculations based on modified attitude command 132, output torque command 136, and other considerations like environmental conditions, available power, vehicle torque limits 116, among others. Inertia compensator may adjust vehicle torque limits 116 for certain periods of time wherein, for example, output torque command 136 may be allowed to overspeed a propulsor to start the propulsor's rotating physical components and then quickly step down the torque as required to maintain the commanded torque. The inertia compensator which may include a lead filter.

Mixer 128 may be configured to generate a first torque command for at least a propulsor. First torque command may include at least a torque vector. First torque command may be represented in any suitable form, which may include, without limitation, vectors, matrices, coefficients, scores, ranks, or other numerical comparators, and the like. A "vector" as defined in this disclosure is a data structure that represents one or more quantitative values and/or measures of forces, torques, signals, commands, or any other data structure as described in the entirety of this disclosure. A vector may be represented as an n-tuple of values, where n is at least two values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where a is attribute number i of the vector. Scaling and/or normalization may function to make vector comparison independent of absolute quantities of attributes, while preserving any dependency on similarity of attributes. One of ordinary skill in the art would appreciate a vector to be a mathematical value consisting of a direction and magnitude.

With continued reference to FIG. 1, "torque", for the purposes of this disclosure, refers to a twisting force that tends to cause rotation. Torque is the rotational equivalent of linear force. In three dimensions, the torque is a pseudovector; for point particles, it is given by the cross product of the position vector (distance vector) and the force vector. The magnitude of torque of a rigid body depends on three quantities: the force applied, the lever arm vector connecting the point about which the torque is being measured to the point of force application, and the angle between the force and lever arm vectors. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. The direction of the torque can be determined by using the right-hand grip rule: if the fingers of the right hand are curled from the direction of the lever arm to the direction of the force, then the thumb points in the direction of the torque. One of ordinary skill in the art would appreciate that torque is represented as a vector, consistent with this disclosure, and therefore includes a magnitude of force and a direction. "Torque" and "moment" are equivalents for the purposes of this disclosure. Any torque command or signal herein may include at least the steady state torque to achieve the initial vehicle torque signal 108 output to at least a propulsor.

With continued reference to FIG. 1, system 100 includes display 144. Display 144 is configured to present, to a user, the remaining vehicle torque 140 and the output toque command 136. Display 144 may include a graphical user interface, multi-function display (MFD), primary display, gauges, graphs, audio cues, visual cues, information on a heads-up display (HUD) or a combination thereof. Display 144 may include a display disposed in one or more areas of an aircraft, on a user device remotely located, one or more computing devices, or a combination thereof. Display 144 may be disposed in a projection, hologram, or screen within a user's helmet, eyeglasses, contact lens, or a combination thereof. System 100 may include display 144 that displays remaining vehicle torque 140 to a user in graphical form. Graphical form may include a two-dimensional plot of two variables in that represent real-world data, such as pitch torque vs. roll torque of an aircraft. System 100 may include display 144 wherein the remaining vehicle torque 140 is presented to a user in a graphical representation of an electric aircraft. In a non-limiting example, a graphical representation of an electric aircraft may show arrows, levels, bar graphs, percentages, or another representation of remaining vehicle torques in a plurality of planes of motion such as pitch moment, roll moment, yaw moment, and lift force, individually or collectively. Remaining vehicle torque 140 may include remaining vehicle torque capability in an aircraft's pitch moment. Remaining vehicle torque 140 may include the remaining vehicle torque capability in an aircraft's roll moment.

Figure 2:
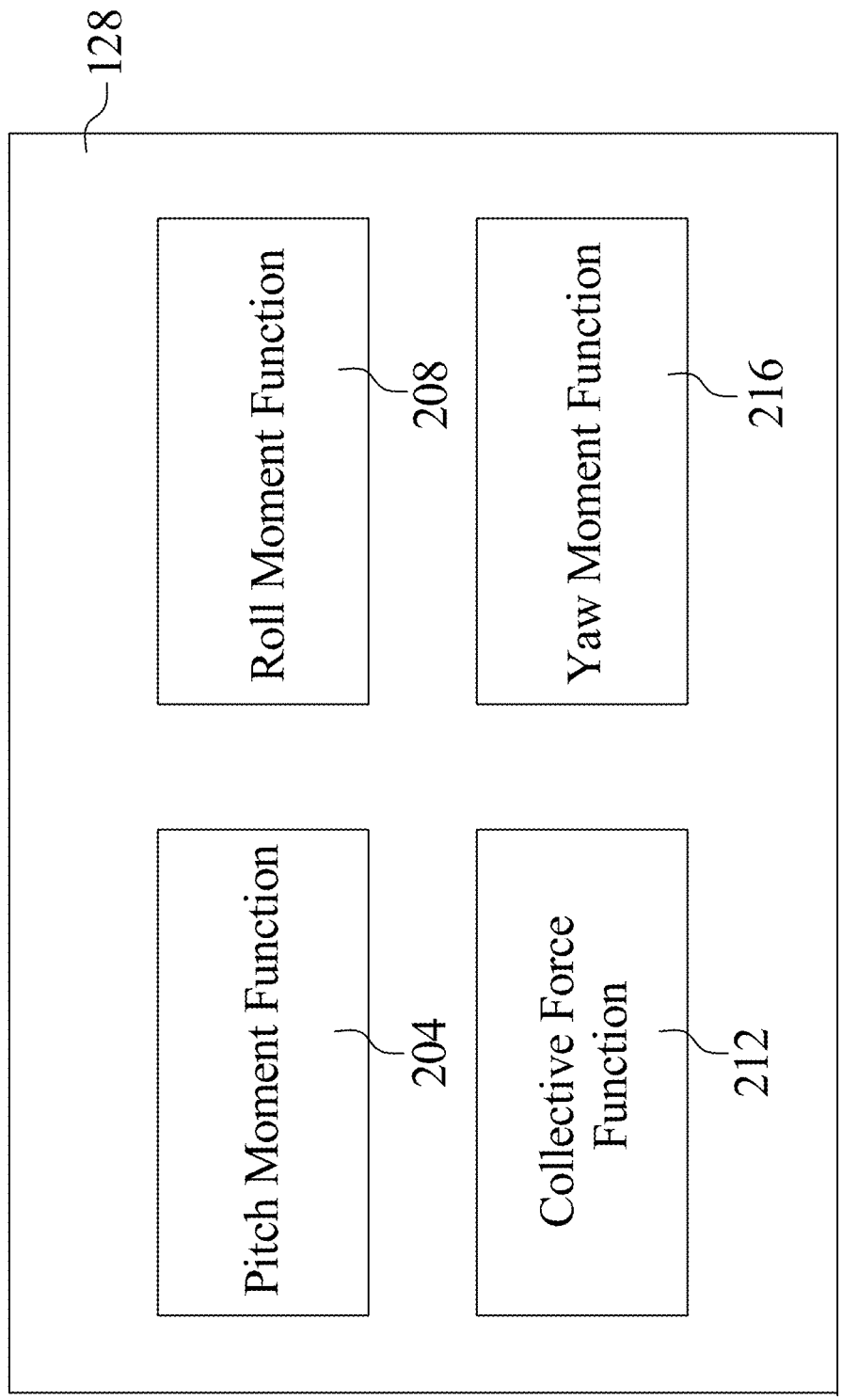
FIG. 2 is a block diagram illustrating an exemplary embodiment of a mixer and sequential problems solved therein.

Referring now to FIG. 2, mixer 128 is presented. As previously disclosed, solving at least an optimization problem may include solving sequential problems relating to vehicle-level inputs to at least a propulsor, namely pitch, roll, yaw, and collective force. Mixer 128 may solve at least an optimization problem in a specific order. An exemplary sequence is presented here in FIG. 2. According to exemplary embodiments, mixer 128 may solve at least an optimization problem wherein the at least an optimization problem includes a pitch moment function 204; optimization problem may be a nonlinear program. Solving may be performed using a nonlinear program and/or a linear program. Mixer 128 may solve at least an optimization problem wherein solving at least an optimization program may include solving a roll moment function 208 utilizing a nonlinear program to yield the desired amount of roll moment as a function of the desired amount of pitch moment. Mixer 128 may solve at least an optimization problem wherein solving at least an optimization program may include solving a collective force function 212 utilizing a nonlinear program to yield the desired amount of collective force as a function of the desired amount of pitch moment and the desired amount of roll moment. Mixer 128 may solve at least an optimization problem wherein solving at least an optimization program may include solving a yaw moment function 216 utilizing a nonlinear program to yield the desired amount of yaw moment, as a function of the desired amount of pitch moment, the desired amount of roll moment, and the desired amount of collective force. One of ordinary skill in the art, after reading the entirety of this disclosure, will appreciate that any force program may be implemented as a linear or non-linear program, as any linear program may be expressed as a nonlinear program.

Figure 3:
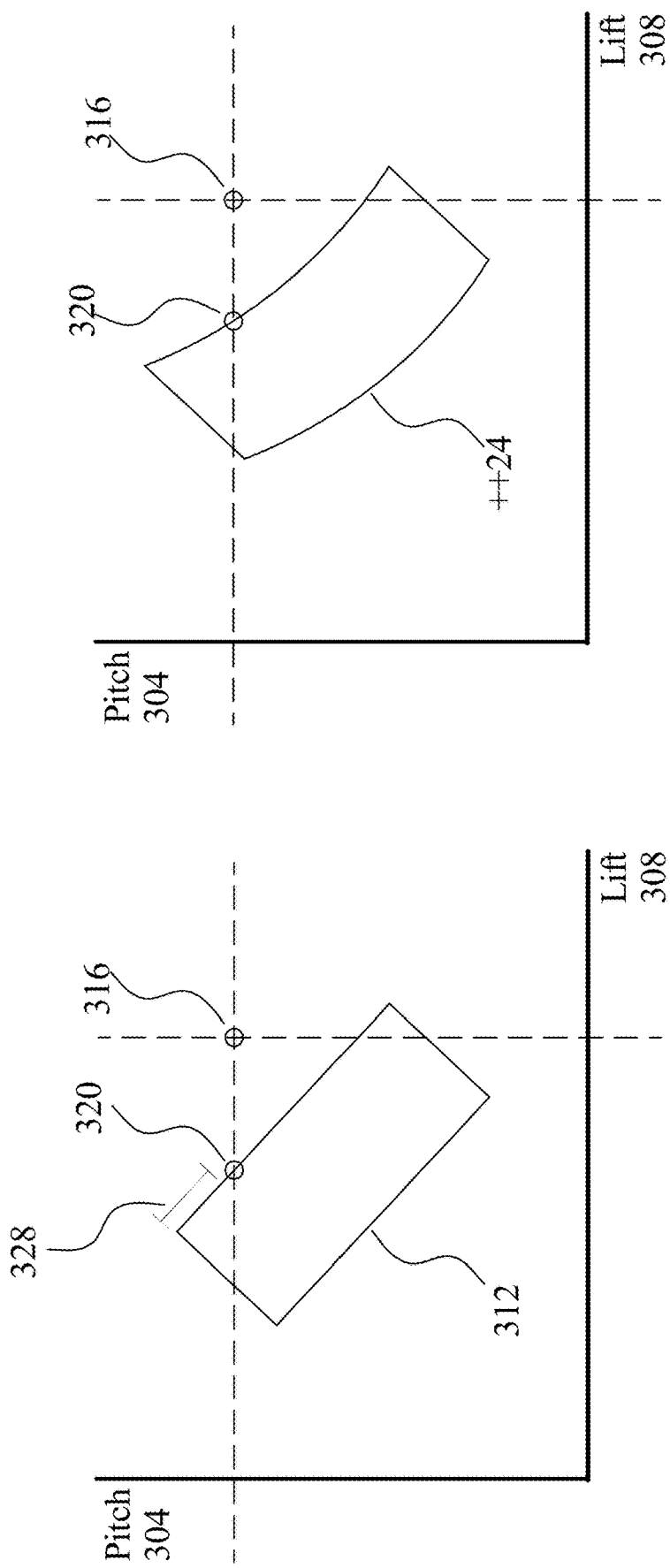
FIGS. 3A and 3B are graphical representations illustrating the herein disclosed system for torque allocation in an electric aircraft, without and with inertial compensation, respectively.

Referring now to FIG. 3A, torque allocator 300 is presented in graphical form. Torque allocator 300 may be disposed fully or partially within mixer 128 as disclosed herein. Torque allocator 300 may include one or more computing devices as described herein. Torque allocator 300 may be a separate component or grouping of components from those described herein. Torque allocator 300 may be configured to allocate a portion of total possible torque amongst one or more propulsors based on relative priority of a plurality attitude control commands and desired aircraft maneuver. In a non-limiting illustrative example, torque allocation between two attitude control components (e.g., pitch and roll or roll and yaw) may be based on the relative priorities of those two attitude control components. Priority refers to how important to the safety of the aircraft and any users while performing the attitude control component is relative to the other attitude control commands. Priority may also refer to the relative importance of each attitude control component to accomplish one or more desired aircraft maneuvers. For example, pitch attitude control component may be the highest priority, followed by roll, lift, and yaw attitude control components. In another example, the relative priority of the attitude components may be specific to an environment, aircraft maneuver, mission type, aircraft configuration, or other factors, to name a few. Torque allocator may set the highest priority attitude control component torque allocation as close as possible given the torque limits as described in this disclosure to the original command for the higher-priority attitude control component, in the illustrative example, pitch, then project to the value possible for the lower priority attitude control component, in this case, lift. The higher priority attitude control component in the first torque allocation may be the attitude control component with the highest overall priority. This process is then repeated with lower priority attitude control component from the above comparison and the next highest down the priority list. In a non-limiting illustrative example, the next two-dimensional torque allocation problem solved would include lift and roll attitude control commands. In embodiments, the lower priority attitude command component has already been set form the previous two-dimensional torque allocation, so this is projecting the closest possible value for the third-level attitude command (roll in this example). This process would repeat again for the third and fourth attitude components, in this non-limiting example, roll and yaw attitude control components. Since roll is prioritized over yaw, the roll attitude control command would be preserved and yaw would be sacrificed as a function of the vehicle torque limits as described herein. After the sequence of two-dimensional attitude control component torque allocation are completed and four prioritized attitude component commands are set, one or more components may send out commands to flight control surfaces/propulsors to generate the set torque values allocated in the foregoing process. As a non-limiting example of one step in the torque allocation process, FIG. 3A illustrates a pitch axis 304 and lift axis 308. Pitch axis 304 represents the command or plurality of attitude commands 112 inputted to mixer 128 as described herein. Pitch axis 304 may be conditioned or altered to be inputted to mixer 128. For example, and without limitation, initial vehicle torque signal 108 may include pitch and lift commands within plurality of attitude commands 112. Torque allocator 300 may also receive at least a vehicle torque limit 312, which may be represented without limitation by a box plotted within the pitch and lift axes, which may be the same as or similar to at least a vehicle torque limit 116. A point where pitch command and lift command intersect may represent initial vehicle torque signal 316 as projected onto exemplary graph of pitch and lift axes, which may be the same or similar to initial vehicle torque signal 108 as disclosed in the entirety of this disclosure. Torque allocator 300 utilizes prioritization data as described in the entirety of this disclosure to solve this two-dimensional problem by preserving the higher priority command and sacrificing the lower priority command. This prioritization preservation process may be illustrated, as a non-limiting example by placement of modified attitude command 320, wherein the pitch command was preserved (horizontally translated and therefore unchanged from the initial command), while the lift command was lessened to bring the modified attitude command within vehicle torque limits 312 (the box). Modified attitude command 328, as discussed in the entirety of this disclosure, may be further combined, modified, conditioned, or otherwise adjusted to produce output torque command 136 to the plurality of propulsors. Remaining vehicle torque 328 represents the remaining torque capability in one or more propulsors before, during, and after an aircraft maneuver. Remaining vehicle torque 328 may include an individual propulsor's remaining torque capability, one or more of pitch, roll, yaw, and lift, capabilities of one or more propulsors, the remaining vehicle-level torque or power for subsequent maneuvers. Remaining vehicle torque 328 may be displayed to a pilot or user in the graphic presented here in FIG. 3A. The above-described is a non-limiting example of one step in the torque allocation process. For example, Referring now to FIG. 3B, torque allocator 300 is again presented in graphical form of a two-dimensional plot of pitch vs. lift with inertia compensation. Torque allocator 300 is presented in graphical form. Torque allocation process may be similar or the same process as described above in regard to FIG. 3A, with the torque limits adjusted for inertia compensation. Torque allocator 300 may be disposed fully or partially within mixer 128 as disclosed herein. Torque allocator 300 may include one or more computing devices as described herein. Torque allocator 300 may be a separate component or grouping of components from those described herein. FIG. 3 includes pitch axis 304 and lift axis 308. Pitch axis 304 represents the command or plurality of attitude commands 112 inputted to mixer 128 as described herein. Pitch axis 304 may be conditioned or altered to be inputted to mixer 128. For example, and without limitation, initial vehicle torque signal 108 may include pitch and lift commands within plurality of attitude commands 112. Torque allocator 300 also receives at least a vehicle torque limit 324 represented by the box plotted within the pitch and lift axes, which may be the same as, or similar to at least a vehicle torque limit 116. Here in FIG. 3B, instead of the box being made of straight linear sides, the inertia compensation as previously discussed creates curved limits, wherein certain plurality of attitude commands 112 may be allowed whereas without inertia compensation they would be outside of the limits represented by the rectangle in FIG. 3A. Where the pitch command and lift command intersect is the initial vehicle torque signal 316, which may be the same or similar to initial vehicle torque signal 108 as disclosed in the entirety of this disclosure. Torque allocator 300 utilizes prioritization data as described in the entirety of this disclosure to solve this two-dimensional problem by preserving the higher priority command and sacrificing the lower priority command. This prioritization preservation process is shown by the placement of modified attitude command 320, wherein the pitch command was preserved (horizontally translated and therefore unchanged from the initial command), while the lift command was lessened to bring the modified attitude command within vehicle torque limits 324 (the box). Modified attitude command 328 effectively commands the amount of torque to one or more propulsors to accomplish the closest vehicle level torque to initial vehicle torque signal 108 as possible given certain limits, maneuvers, and aircraft conditions. Modified attitude command 328, as discussed in the entirety of this disclosure, may be further combined, modified, conditioned, or otherwise adjusted to produce output torque command 136 to the plurality of propulsors. Remaining vehicle torque 328 represents the remaining torque capability in one or more propulsors before, during, and after an aircraft maneuver. Remaining vehicle torque 328 may include an individual propulsor's remaining torque capability, one or more of pitch, roll, yaw, and lift, capabilities of one or more propulsors, the remaining vehicle-level torque or power for subsequent maneuvers. Remaining vehicle torque 328 may be displayed to a pilot or user in the graphic presented here in FIG. 3A.

Figure 4:
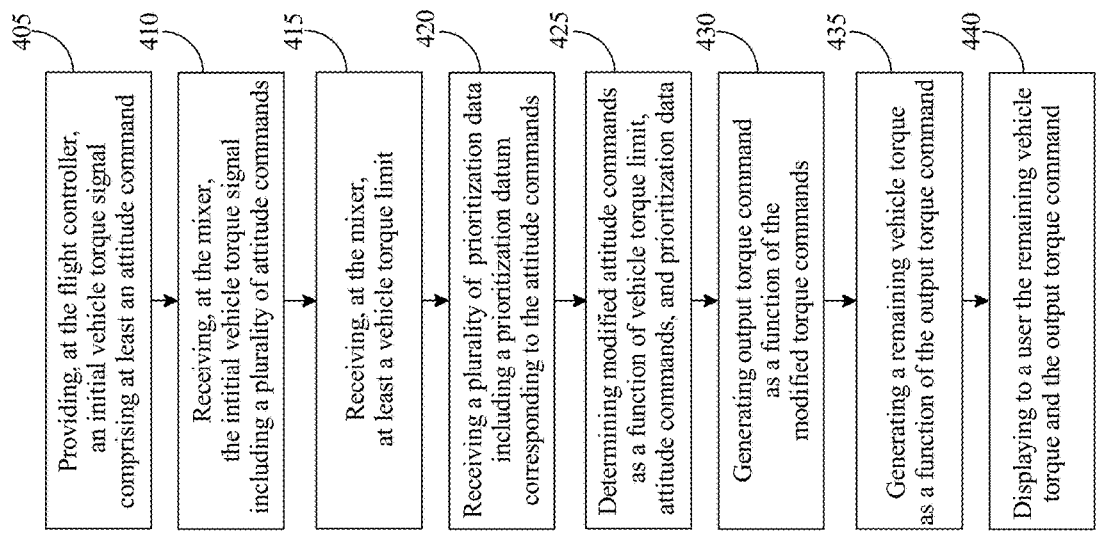
FIG. 4 is a flow chart of an exemplary embodiment of a method of flight control in electric aircraft.

Referring now to FIG. 4, a method 400 is presented in flow diagram form for flight control configured for use in an electric aircraft. At 405, method 400 includes providing, at the flight controller, an initial vehicle torque signal including a plurality of attitude commands. The flight controller may be any flight controller as described herein. The initial vehicle torque signal may be any initial vehicle torque signal as described herein. The plurality of attitude commands may include any attitude commands as described herein. The flight controller may include a proportional-integral-derivative (PID) controller.

At 410, method 400 includes receiving, at the mixer, the initial vehicle torque signal including a plurality of attitude commands. The mixer may be any mixer as described herein. The mixer may include an inertia compensator as described herein. The inertia compensator may include a lead filter, as described herein. The mixer may include an electrical logic circuit as described herein. The mixer may include a processor as described herein. The initial vehicle torque signal may include any initial vehicle torque signal as described herein.

At 415, method 400 includes receiving, at the mixer, at least a vehicle torque limit. The at least a vehicle torque limit may include any vehicle torque limit as described herein, including but not limited to individual propulsor limits, vehicle-level attitude limits, collective propulsor torque limits, and collective torque lift force limits, among others.

At 420, method 400 includes receiving a plurality of prioritization data including a prioritization datum corresponding to the plurality of attitude commands. The prioritization data may be any prioritization described herein. The prioritization datum may include any prioritization datum as described herein. The plurality of attitude commands may include any of the plurality of attitude commands as described herein.

At 425, method 400 includes determining modified attitude commands as a function of the at least a vehicle torque limit, plurality of attitude commands, and prioritization data. The at least a vehicle torque limit may be any vehicle torque limit as described herein. The plurality of attitude commands may include any of the plurality of attitude commands as described herein. The prioritization data may include any prioritization data as described herein.

At 430, method 400 includes generating, at the mixer, an output torque command as a function of the modified torque commands. The output torque command may include any output torque command as described herein. The modified torque commands may include any modified torque commands as described herein.

At 435, method 400 includes generating, at the mixer, a remaining vehicle torque as a function of the output torque command. Remaining vehicle torque may include any remaining vehicle torque as described herein. The output torque command may include any output torque command as described herein. The remaining vehicle torque may include the remaining vehicle torque capability in an aircraft's yaw moment. The remaining vehicle torque may include the remaining vehicle torque capability in an aircraft's assisted lift.

At 440, method 400 includes displaying, to a user, the remaining vehicle torque and the output torque command. The remaining vehicle torque may be any remaining vehicle torque as described herein. The output torque command may include any output torque command as described herein. The remaining vehicle torque is presented to a user in graphical form. The remaining vehicle torque is presented to a user in a graphical representation of an electric aircraft.

Figure 5:
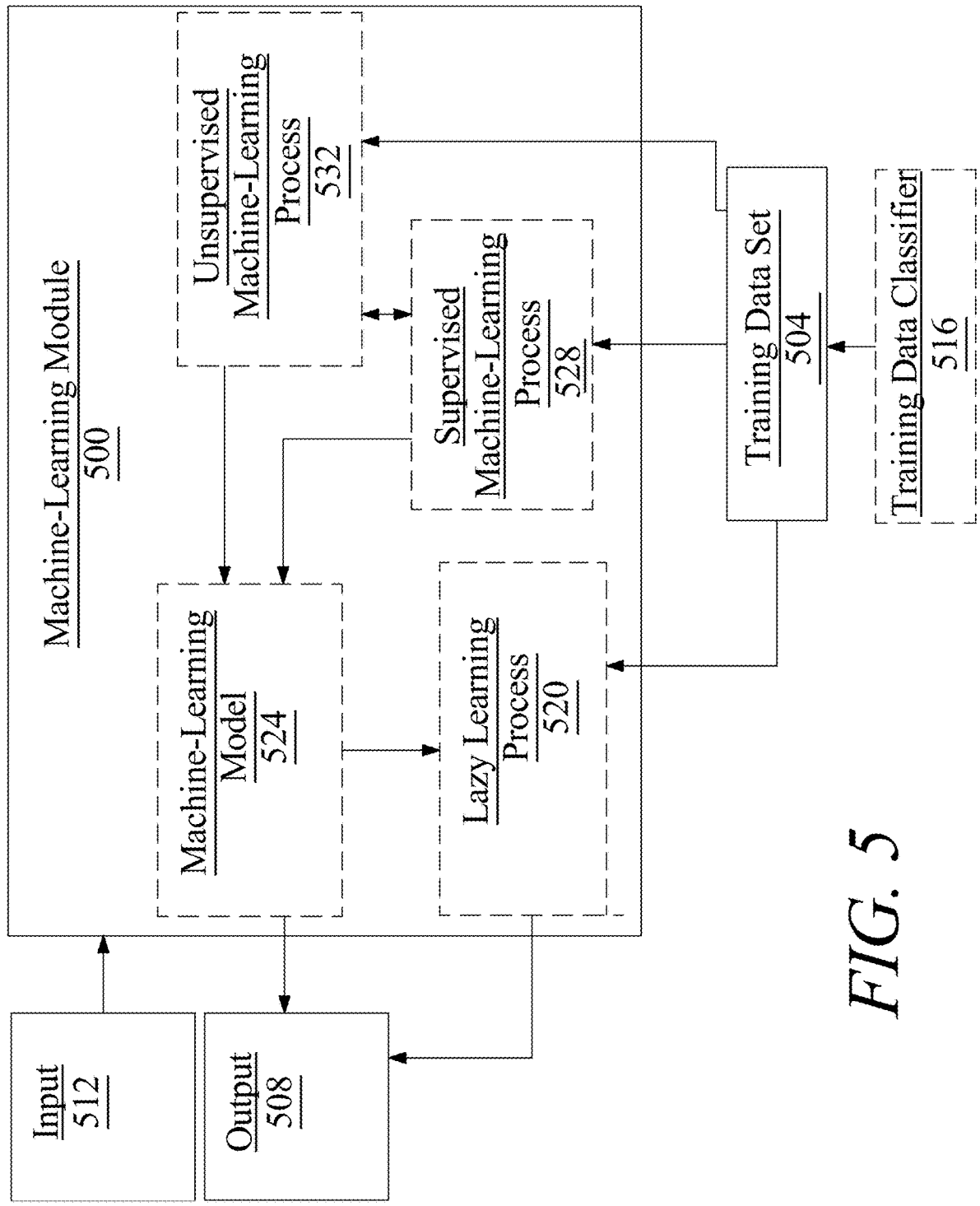
FIG. 5 is a block diagram illustrating an exemplary embodiment of a machine-learning process.

Any of the herein disclosed system and methods may be implemented using machine-learning. Referring now to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example machine-learning process may input user preferences and candidate transfer apparatus performance archive 124 and output a ranking of performance prognoses.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to only correlate performance prognoses to candidate transfer apparatuses for transfer apparatuses capable of completing a transfer invocation, similarly to a cohort of persons and/or other analyzed items and/or phenomena for which a subset of training data may be selected.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 542. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 5, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 504.

Figure 6:
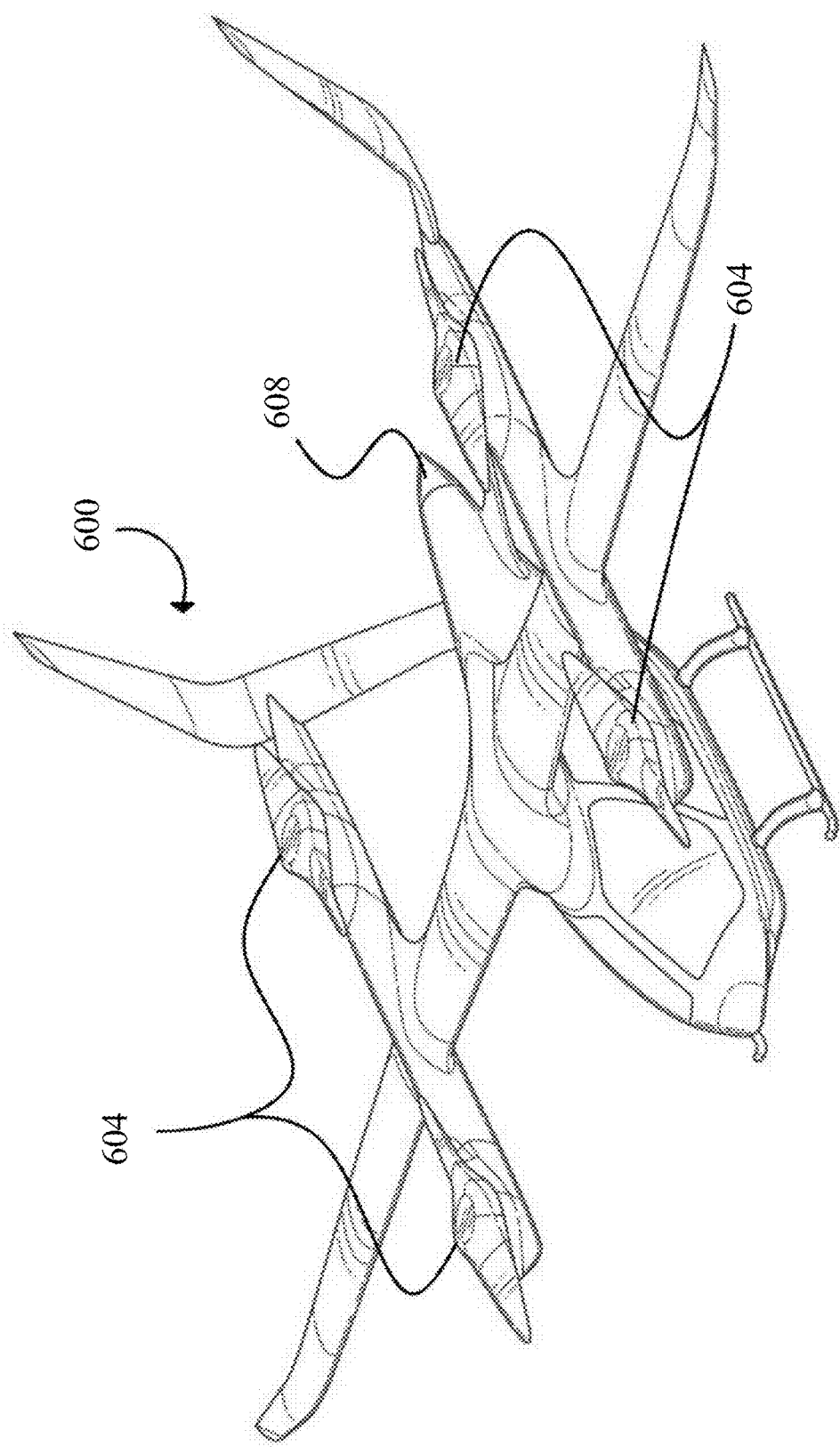
FIG. 6 is an illustration of an embodiment of an electric aircraft.

Referring now to FIG. 6, an embodiment of an electric aircraft 600 is presented. Still referring to FIG. 6, electric aircraft 600 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 6, a number of aerodynamic forces may act upon the electric aircraft 600 during flight. Forces acting on an electric aircraft 600 during flight may include, without limitation, thrust, the forward force produced by the rotating element of the electric aircraft 600 and acts parallel to the longitudinal axis. Another force acting upon electric aircraft 600 may be, without limitation, drag, which may be defined as a rearward retarding force which is caused by disruption of airflow by any protruding surface of the electric aircraft 600 such as, without limitation, the wing, rotor, and fuselage. Drag may oppose thrust and acts rearward parallel to the relative wind. A further force acting upon electric aircraft 600 may include, without limitation, weight, which may include a combined load of the electric aircraft 600 itself, crew, baggage, and/or fuel. Weight may pull electric aircraft 600 downward due to the force of gravity. An additional force acting on electric aircraft 600 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 600 are designed to be as lightweight as possible. Reducing the weight of the aircraft and designing to reduce the number of components is essential to optimize the weight. To save energy, it may be useful to reduce weight of components of an electric aircraft 600, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 600 and/or propulsors.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
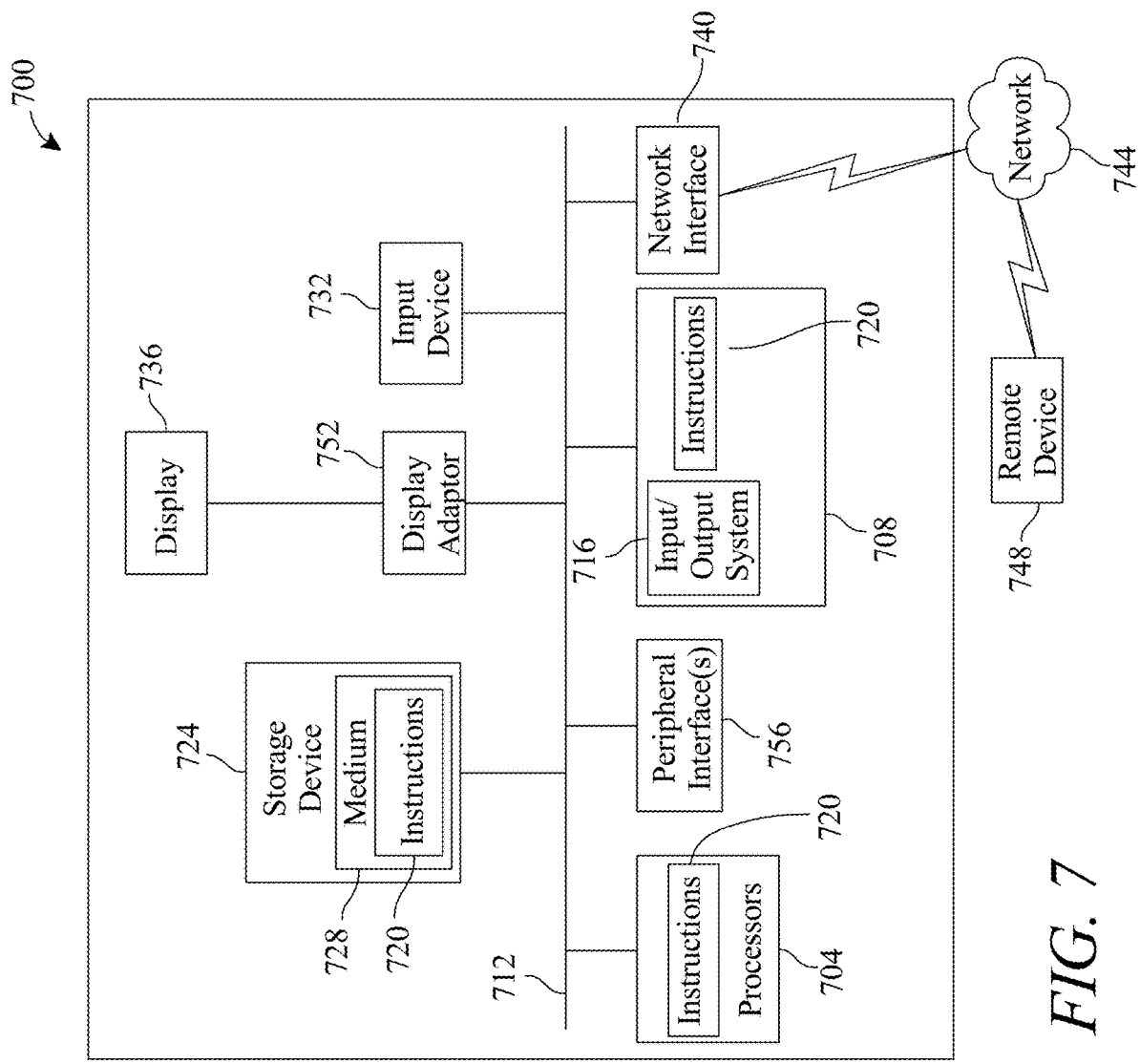
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC)

Memory 708 may include various components (e.g., machine-readable media) including, but not limited to, a random-access memory component, a read only component, and any combinations thereof. In one example, a basic input/output system 715 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 735, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 735. Examples of a display device include, but are not limited to, a liquid crystal display (LCD), a cathode ray tube (CRT), a plasma display, a light emitting diode (LED) display, and any combinations thereof. Display adapter 752 and display device 735 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 755. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for flight control in electric aircraft, the system comprising:
    a flight controller, wherein the flight controller is configured to provide an initial vehicle torque signal comprising a plurality of attitude commands;
    a mixer, wherein the mixer includes circuitry configured to:
        receive the initial vehicle torque signal;
        receive at least a vehicle torque limit;
        receive a plurality of prioritization data, the plurality of prioritization data including a prioritization datum corresponding to each of the plurality of attitude commands;
        determine a plurality of modified attitude commands as a function of the at least a vehicle torque limit, the plurality of attitude commands, and the plurality of prioritization data;
        generate, as a function of modified attitude commands, an output torque command, wherein the output torque command includes the initial vehicle torque signal adjusted as a function of the at least a vehicle torque limit;
        generate, as a function of the output torque command, a remaining vehicle torque;
    a display, wherein the display is configured to present, to a user, the remaining vehicle torque and the output torque command.

2. The system of claim 1, wherein the mixer comprises an inertia compensator.

3. The system of claim 2, wherein the inertia compensator comprises a lead filter.

4. The system of claim 1, wherein the mixer is implemented using an electrical logic circuit.

5. The system of claim 1, wherein the mixer is implemented using a processor.

6. The system of claim 1, wherein the flight controller is a proportional-integral-derivative (PID) controller.

7. The system of claim 1, wherein the remaining vehicle torque is presented to a user in graphical form.

8. The system of claim 1, wherein the remaining vehicle torque is presented to a user in a graphical representation of an electric aircraft.

9. The system of claim 1, wherein the remaining vehicle torque comprises the remaining vehicle torque capability in an aircraft's pitch moment.

10. The system of claim 1, wherein the remaining vehicle torque comprises the remaining vehicle torque capability in an aircraft's roll moment.

11. A method for flight control in electric aircraft, the method comprising:
    providing, at the flight controller, an initial vehicle torque signal comprising at least an attitude command;

receiving, at the mixer, the initial vehicle torque signal including a plurality of attitude commands;

receiving, at the mixer, at least a vehicle torque limit;

receiving, at the mixer, a plurality of prioritization data including a prioritization datum corresponding to each of the plurality of attitude commands;

determining, at the mixer, a plurality of modified attitude commands as a function of the at least a vehicle torque limit, the plurality of attitude commands, and the plurality of prioritization data;

generating, at the mixer, as a function of modified attitude commands, an output torque command, wherein the output torque command includes the initial vehicle torque signal adjusted as a function of the at least a vehicle torque limit;

generating, at the mixer, as a function of the output torque command, a remaining vehicle torque;

displaying to a user the remaining vehicle torque and the output torque command.

12. The method of claim 11, wherein the mixer comprises an inertia compensator.

13. The method of claim 12, wherein the inertia compensator comprises a lead filter.

14. The method of claim 11, wherein the mixer is implemented using an electrical logic circuit.

15. The method of claim 11, wherein the mixer is implemented using a processor.

16. The method of claim 11, wherein the flight controller is a proportional-integral-derivative (PID) controller.

17. The method of claim 11, wherein the remaining vehicle torque is presented to a user in graphical form.

18. The method of claim 11, wherein the remaining vehicle torque is presented to a user in a graphical representation of an electric aircraft.

19. The method of claim 11, wherein the remaining vehicle torque comprises the remaining vehicle torque capability in an aircraft's yaw moment.

20. The method of claim 11, wherein the remaining vehicle torque comprises the remaining vehicle torque capability in an aircraft's assisted lift.

* * * * *